US008055642B2

(12) United States Patent
Boal et al.

(10) Patent No.: US 8,055,642 B2
(45) Date of Patent: *Nov. 8, 2011

(54) SYSTEM AND METHOD FOR AUGMENTING CONTENT IN ELECTRONIC DOCUMENTS WITH LINKS TO CONTEXTUALLY RELEVANT INFORMATION

(75) Inventors: Steven R Boal, Los Altos, CA (US); Michael Walsh, San Francisco, CA (US)

(73) Assignee: Coupons.com Incorporated, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/638,856

(22) Filed: Dec. 15, 2009

(65) Prior Publication Data

US 2010/0094873 A1    Apr. 15, 2010

Related U.S. Application Data

(63) Continuation of application No. 11/527,856, filed on Sep. 26, 2006, now Pat. No. 7,640,240.

(60) Provisional application No. 60/720,734, filed on Sep. 26, 2005.

(51) Int. Cl.
*G06F 17/30* (2006.01)

(52) U.S. Cl. ........ 707/706; 707/708; 707/726; 707/727; 707/728; 707/729; 707/755; 707/769; 707/770; 707/771; 705/14.4

(58) Field of Classification Search .................. 707/713, 707/726, 728, 706, 708, 727, 729, 755, 769, 707/770, 771; 705/14, 14.4
See application file for complete search history.

(56) References Cited

U.S. PATENT DOCUMENTS

| 4,791,281 | A | 12/1988 | Johnsen et al. |
| 4,882,675 | A | 11/1989 | Nichtberger et al. |
| 4,896,791 | A | 1/1990 | Smith |
| 4,910,672 | A | 3/1990 | Off et al. |
| 4,926,255 | A | 5/1990 | Von Kohorn |
| 4,949,256 | A | 8/1990 | Humble |
| 5,034,807 | A | 7/1991 | Von Kohorn |

(Continued)

FOREIGN PATENT DOCUMENTS

EP    0 512 509 A2    11/1992

(Continued)

OTHER PUBLICATIONS

Douglass, "Cruising for Food Savings on Internet," The San Diego Union-Tribune, Apr. 20, 1996, Section: Business, p. C1, 2 pages.

(Continued)

*Primary Examiner* — Thanh-Ha Dang
(74) *Attorney, Agent, or Firm* — Hickman Palermo Truong & Becker LLP

(57) ABSTRACT

An electronic document and associated system, methods and apparatus is described. The electronic document is loaded in a user device configured to communicate with an external device that generates instructions for augmenting content contained in the electronic document with links to contextually relevant information. The content can be augmented with one or more user interface elements, and the augmented content can be displayed with one or more attributes which can be selected by a document author. The document author can mark or otherwise designate one or more portions of the electronic document to be excluded from the augmenting process.

20 Claims, 9 Drawing Sheets

U.S. PATENT DOCUMENTS

| | | | |
|---|---|---|---|
| 5,056,019 A | 10/1991 | Schultz et al. | |
| 5,057,915 A | 10/1991 | Von Kohorn | |
| 5,245,533 A | 9/1993 | Marshall | |
| 5,283,731 A | 2/1994 | Lalonde | |
| 5,283,734 A | 2/1994 | Von Kohorn | |
| 5,285,278 A | 2/1994 | Holman | |
| 5,287,181 A | 2/1994 | Holman | |
| 5,305,195 A | 4/1994 | Murphy | |
| 5,305,197 A | 4/1994 | Axler et al. | |
| 5,353,218 A | 10/1994 | De Lapa et al. | |
| 5,361,871 A | 11/1994 | Gupta | |
| 5,368,129 A | 11/1994 | Von Kohorn | |
| 5,380,991 A | 1/1995 | Valencia et al. | |
| 5,401,946 A | 3/1995 | Weinblatt | |
| 5,420,606 A | 5/1995 | Begum | |
| 5,459,306 A | 10/1995 | Stein et al. | |
| 5,483,049 A | 1/1996 | Schulze, Jr. | |
| 5,488,423 A | 1/1996 | Walkingshaw et al. | |
| 5,500,681 A | 3/1996 | Jones | |
| 5,502,636 A | 3/1996 | Clarke | |
| 5,504,519 A | 4/1996 | Remillard | |
| 5,508,731 A | 4/1996 | Von Kohorn | |
| 5,509,070 A | 4/1996 | Schull | |
| 5,528,490 A | 6/1996 | Hill | |
| 5,557,721 A | 9/1996 | Fite et al. | |
| 5,594,910 A | 1/1997 | Filepp | |
| 5,604,542 A | 2/1997 | Dedrick | |
| 5,612,527 A | 3/1997 | Ovadia | |
| 5,636,346 A | 6/1997 | Saxe | |
| 5,642,485 A | 6/1997 | Deaton | |
| 5,687,322 A | 11/1997 | Deaton et al. | |
| 5,697,844 A | 12/1997 | Von Kohorn | |
| 5,708,782 A | 1/1998 | Larson et al. | |
| 5,710,884 A | 1/1998 | Dedrick | |
| 5,710,886 A | 1/1998 | Christensen et al. | |
| 5,713,795 A | 2/1998 | Von Kohorn | |
| 5,715,314 A | 2/1998 | Payne | |
| 5,724,521 A | 3/1998 | Dedrick | |
| 5,759,101 A | 6/1998 | Von Kohorn | |
| 5,761,648 A | 6/1998 | Golden et al. | |
| 5,761,683 A | 6/1998 | Logan et al. | |
| 5,774,869 A | 6/1998 | Toader | |
| 5,791,991 A | 8/1998 | Small | |
| 5,821,512 A | 10/1998 | O'Hagan et al. | |
| 5,822,735 A * | 10/1998 | De Lapa et al. | 705/14.26 |
| 5,845,302 A | 12/1998 | Cyman, Jr. | |
| 5,855,007 A | 12/1998 | Jovicic | |
| 5,884,033 A | 3/1999 | Duvall | |
| 5,903,874 A * | 5/1999 | Leonard et al. | 705/14.26 |
| 5,907,830 A | 5/1999 | Engel et al. | |
| 5,916,024 A | 6/1999 | Von Kohorn | |
| 5,918,211 A | 6/1999 | Sloane | |
| 5,918,213 A | 6/1999 | Bernard et al. | |
| 5,969,678 A | 10/1999 | Stewart | |
| 5,979,757 A | 11/1999 | Tracy et al. | |
| 6,002,771 A | 12/1999 | Nielsen | |
| 6,006,269 A | 12/1999 | Phaal | |
| 6,009,411 A | 12/1999 | Kepecs | |
| 6,014,634 A | 1/2000 | Scroggie et al. | |
| 6,047,310 A | 4/2000 | Kamakura et al. | |
| 6,065,056 A * | 5/2000 | Bradshaw et al. | 709/229 |
| 6,076,068 A * | 6/2000 | DeLapa et al. | 705/14.26 |
| 6,129,276 A | 10/2000 | Jelen et al. | |
| 6,134,532 A * | 10/2000 | Lazarus et al. | 705/14.25 |
| 6,185,541 B1 * | 2/2001 | Scroggie et al. | 705/14.23 |
| 6,292,786 B1 * | 9/2001 | Deaton et al. | 705/14.25 |
| 6,298,329 B1 | 10/2001 | Walker et al. | |
| 6,298,446 B1 | 10/2001 | Schreiber et al. | |
| 6,321,208 B1 | 11/2001 | Barnett et al. | |
| 6,332,127 B1 | 12/2001 | Bandera et al. | |
| 6,336,099 B1 * | 1/2002 | Barnett et al. | 705/14.35 |
| 6,360,254 B1 | 3/2002 | Linden et al. | |
| 6,377,935 B1 | 4/2002 | Deaton et al. | |
| 6,377,986 B1 | 4/2002 | Philyaw et al. | |
| 6,385,591 B1 | 5/2002 | Mankoff | |
| 6,434,530 B1 | 8/2002 | Sloane et al. | |
| 6,484,939 B1 | 11/2002 | Blaeuer | |
| 6,615,179 B1 | 9/2003 | McNicol et al. | |
| 6,638,316 B1 | 10/2003 | Tyler et al. | |
| 6,687,346 B1 | 2/2004 | Swartz et al. | |
| 6,915,271 B1 * | 7/2005 | Meyer et al. | 705/14.35 |
| 7,032,030 B1 | 4/2006 | Codignotto | |
| 7,302,696 B1 * | 11/2007 | Yamamoto | 725/23 |
| 7,827,058 B2 * | 11/2010 | Mortimer | 705/14.34 |
| 7,840,894 B2 * | 11/2010 | Brown et al. | 715/234 |
| 7,933,800 B2 * | 4/2011 | Main et al. | 705/14.1 |
| 7,945,476 B2 * | 5/2011 | Subramanian et al. | 705/14.67 |
| 2001/0042010 A1 * | 11/2001 | Hassell | 705/14 |
| 2001/0049627 A1 * | 12/2001 | Simpson | 705/14 |
| 2002/0123912 A1 | 9/2002 | Subramanian et al. | 705/5 |
| 2002/0138346 A1 * | 9/2002 | Kodaka et al. | 705/14 |
| 2002/0169662 A1 * | 11/2002 | Claiborne | 705/14 |
| 2002/0194069 A1 | 12/2002 | Thakur et al. | |
| 2004/0030598 A1 * | 2/2004 | Boal | 705/14 |
| 2004/0054575 A1 * | 3/2004 | Marshall | 705/14 |
| 2004/0193487 A1 | 9/2004 | Purcell et al. | |
| 2004/0220925 A1 * | 11/2004 | Liu et al. | 707/3 |
| 2004/0230485 A1 | 11/2004 | Barnett et al. | |
| 2005/0149404 A1 * | 7/2005 | Barnett et al. | 705/14 |
| 2005/0262005 A1 | 11/2005 | Woolston | |
| 2006/0015405 A1 * | 1/2006 | Bala et al. | 705/14 |
| 2006/0047573 A1 * | 3/2006 | Mitchell et al. | 705/14 |
| 2006/0074753 A1 * | 4/2006 | Schuh et al. | 705/14 |
| 2006/0116929 A1 * | 6/2006 | Nguyen | 705/14 |
| 2006/0122905 A1 * | 6/2006 | Marshall et al. | 705/26 |
| 2006/0143307 A1 | 6/2006 | Codignotto | |
| 2006/0167857 A1 * | 7/2006 | Kraft et al. | 707/3 |
| 2006/0173742 A1 * | 8/2006 | Heene | 705/14 |
| 2006/0184566 A1 * | 8/2006 | Lo et al. | 707/102 |
| 2007/0038614 A1 * | 2/2007 | Guha | 707/4 |
| 2007/0073690 A1 * | 3/2007 | Boal et al. | 707/6 |
| 2007/0244745 A1 * | 10/2007 | Boal | 705/14 |
| 2007/0244900 A1 * | 10/2007 | Hopkins et al. | 707/10 |
| 2008/0177603 A1 * | 7/2008 | Muthugopalakrishnan et al. | 705/7 |
| 2008/0281680 A1 * | 11/2008 | Laor | 705/10 |
| 2011/0035289 A1 * | 2/2011 | King et al. | 705/14.73 |

FOREIGN PATENT DOCUMENTS

| | | |
|---|---|---|
| WO | WO 95/01060 | 1/1995 |
| WO | WO 97/23838 | 7/1997 |

OTHER PUBLICATIONS

"Emaginet plans to 'push' its way into consumer mindest, pocketbook," Interactive Marketing News, vol. 4, No. 22, May 30, 1997, 2 pages.

Freitag, "In this Computer Age, Who Needs Coupons?," The New York Times, Jun. 15, 1989—p. A1 (2 pages).

Spethmann, "Coupons Shed Low-Tech Image," Brandweek, Oct. 24, 1994, pp. 30-31. http://login.vnuemedia.com/bw/esearch/article_display.jsp?vnu_content_id=54670.

Tanner, "A New Dimension in Marketing", Progressive Grocer, May 1987, pp. 133, 134 & 136.

"Tracking Shoppers with Personal Bar Codes," The New York Times, Jun. 18, 1989.

"Ukrop's Tests Data Base Marketing Program Electronic Couponing Tracks Buying Behavior of Valued Customers," Chain Store Age Executive, Sep. 1987, pp. 73-75.

Wilkies, "Catalina, Coupons Online in Tests," Advertising Age, Aug. 28, 1995, p. 15.

Anderson, "CoolSavings.com Settles Patent-Infringement Suit," The Industry Standard Magazine, Jan. 13, 2000, 2 pages. http://archives.cnn.com/2000/TECH/computing/04/03/coupon.patent.idg/index.html.

Anderson, "Online-coupon companies battle over patents," CNN.com—Technology, Apr. 3, 2000, 4 pages. http://web.archive.org/web/20010712032039/www.thestandard.com/article/0,1902,8853,00.html?

Wolverton, "Coolsavings settles e-coupon patent dispute," CNET News, Jul. 10, 2000, 2 pages. http://news.cnet.com/Coolsavings-settles-e-coupon-patent-dispute/2100-1017_3-242969.html?tag=mncol.

Wolverton, "Coolsavings settle patent suit," CNET News, Dec. 13, 2000, 2 pages. http://news.cnet.com/Coolsavings-settles-patent-suit/2100-1017 3-249876.html?tag=mncol.

"Acu-Trac and Cox Launch Interactive Couponing Service," Electronic Marketplace Report, IAC Newsletter Database, Information Access Company, Mar. 21, 1995, 2 pages.

Graham, I., "The HTML Sourcebook, $2^{nd}$ edition, A Complete Guide to HTML 3.0", Wiley Publishing Company, 1996, pp. 233-234.

Sutherland, "Promotion Profile," Marketing & Media Decisions, vol. 24, No. 10, Oct. 1989, pp. 103(1).

* cited by examiner

INGREDIENTS: 100

24 chocolate sandwich ☐ cookies — 102, 101
1/4 cup butter☐, melted
1 (14 ounce) can sweetened condensed milk☐ — 106
1 teaspoon vanilla extract
2 cups semisweet chocolate chips

DIRECTIONS:

1. Preheat the oven to 325 degrees F (165 degrees C).
2. Set aside 6 cookies and grind the rest in a food processor or blender. In a small bowl, stir together the cookie crumbs and butter until well blended. Press into the bottom of an 11x13 inch pan.
3. Over a double boiler or in the microwave, melt 1 cup of chocolate chips together with the condensed milk and vanilla. Stir frequently until smooth. Spread evenly over the crumb crust. Sprinkle the remaining cup of chocolate chips over the top. Break remaining cookies into pieces by hand and sprinkle over the top.
4. Bake☐ for 20 to 25 minutes in the preheated oven. Chill completely before cutting into bars or it will make a big mess.

Customize this Recipe price.
» Learn More!

Favorite Food Lists:

- Munchies
  a list by: big surprise
- Seriously Good Cookies
  a list by: Joe Bob
- Chocolate recipes – a few good ones
  a list by: REDBRONCO
- More lists...
- Create your own...

ADVERTISEMENT

America's Second Harvest
The Nation's Food Bank Network
Ending Hunger.

GO!

All Season Grilling & BBQ
200 Top rated recipes
Click here

Cookies
200 Top rated recipes
Click here

Thanksgiving & Christmas
200 Top rated recipes
Click here

Cookbook Bundles
Save big with bundles
Click here

104

Sara Lee
Soft & Smooth

INGREDIENTS:

24 chocolate sandwich cookies — 100
1/4 cup butte Print Coupons — 200
1 (14 ounce) 40¢ on any Oroweat product
1 teaspoon v About Concordance™ coupons
2 cups semis... — 202

DIRECTIONS:

1. Preheat the oven to 325 degrees F (165 degrees C).
2. Set aside 6 cookies and grind the rest in a food processor or blender. In a small bowl, stir together the cookie crumbs and butter until well blended. Press into the bottom of an 11x13 inch pan.
3. Over a double boiler or in the microwave, melt 1 cup of chocolate chips together with the condensed milk and vanilla. Stir frequently until smooth. Spread evenly over the crumb crust. Sprinkle the remaining cup of chocolate chips over the top. Break remaining cookies into pieces by hand and sprinkle over the top.
4. Bake for 20 to 25 minutes in the preheated oven. Chill completely before cutting into bars or it will make a big mess.

Customize this Recipe price.
» Learn More!

Favorite Food Lists:

- Munchies
  a list by: big surprise
- Seriously Good Cookies
  a list by: Joe Bob
- Chocolate recipes – a few good ones
  a list by: REDBRONCO

- More Bets...
- Create your own...

ADVERTISEMENT

America's Second Harvest The Nation's Food Bank Network

Ending Hunger.

GO!

All Season Grilling & BBQ 200 Top rated recipes
Click here

Cookies 200 Top rated recipes
Click here

Thanksgiving & Christmas 200 Top rated recipes
Click here

Cookbook Bundles Save big with bundles
Click here

Sara Lee Soft & Smooth

SYSTEM AND METHOD FOR AUGMENTING CONTENT IN ELECTRONIC DOCUMENTS WITH LINKS TO CONTEXTUALLY RELEVANT INFORMATION

BENEFIT CLAIM; RELATED APPLICATIONS

This application claims the benefit of priority as a Continuation of U.S. application Ser. No. 11/527,856, filed Sep. 26, 2006, to be issued as U.S. Pat. No. 7,640,240, and which claimed priority from provisional application 60/720,734, filed Sep. 26, 2005, the entire contents of which are hereby incorporated by reference for all purposes as if fully set forth herein.

BACKGROUND

An electronic coupon distribution system that takes into account user demographics is described in U.S. patent application Ser. No. 09/451,160, entitled "Electronic Coupon Distribution System," filed Nov. 30, 1999, which application is incorporated herein by reference. The selection of electronic coupons for distribution can be based on various criteria, such as the number of times a given coupon is printed or redeemed, as described in U.S. patent application Ser. No. 11/134,048, entitled "Searching A Database Including Prioritizing Results Based on Historical Data," filed May 19, 2005, which application is incorporated herein by reference.

Some conventional electronic coupon distribution systems present coupon offers on web pages. Coupon offers are matched with the general content of the web page, and are typically presented in an advertisement (ad) space (e.g., ad box, banner ad or pop-window). The ad space tends to clutter the user's display screen and interfere with the readability of the web page content. Moreover, some users may be annoyed by such presentation devices making them less inclined to use the coupons or the web page. Other users may simply ignore the coupons because they do not appear relevant to the content of the web page.

SUMMARY

An electronic document (e.g., web page) at a user device (e.g., computer, media player, mobile phone, email device, personal digital assistant (PDA), etc.) configured to communicate with an external device (e.g., network server) that generates instructions for augmenting content (e.g., text, graphical objects, etc.) contained in the electronic document with links to contextually relevant information (e.g., coupons and/or other offerings) is described.

In some implementations, the content is also augmented with one or more user interface elements (e.g., buttons, menus, etc.) In some implementations, the augmented content is displayed with one or more attributes (e.g., color, highlights, fonts, style, size, rollover effects, etc.) which can be selected by a document author (e.g., web page author). In some implementations, the document author can mark or otherwise designate one or more portions of the electronic document to be excluded from the augmenting process.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 is screen shot of an electronic document, including content that is linked to contextually relevant information.

FIG. 2 is a screen shot of the web page shown in FIG. 1, including a display window for providing contextually relevant information.

DETAILED DESCRIPTION

FIG. 1 is screen shot of an electronic document 100 (e.g., web page), including content 102 (e.g., words, graphical objects, etc.) that is augmented with links to contextually relevant information (e.g., coupons and/or other offerings). The web page 100 is typically presented in a browser window (e.g., Microsoft® Internet Explorer). The browser receives a text file containing Hypertext Markup Language (HTML) and/or other known languages (e.g., Dynamic HTML), and interprets the HTML statements to render the web page 100.

Figure 3:
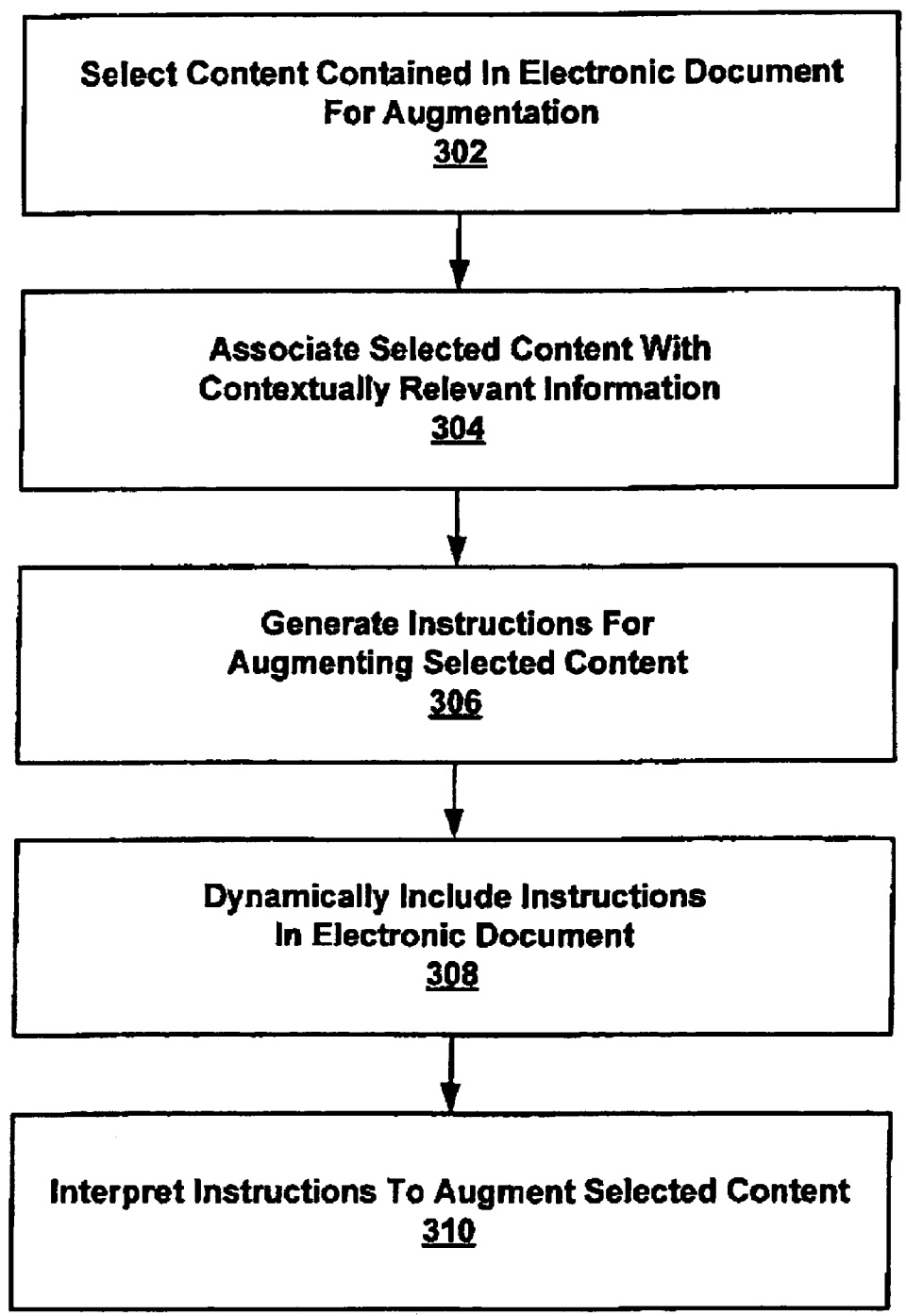
FIG. 3 is a flow diagram of a content augmentation process.

The augmented words 102 (e.g., sandwich, butter, milk) are generated by a content augmentation process 300, as described with respect to FIG. 3. The augmented words 102 can be located anywhere on the web page 100, including in an ad space 104 (e.g., ad box, banner ad, pop-window, etc.). The augmented words 102 include links that are activated in response to user input, such as a mouse click or cursor movement. The augmented words 102 can also include one or more user interface elements 106 for providing additional functionality or control (e.g., buttons, menus, etc.). In some implementations, the augmented words 102 are displayed with one or more attributes (e.g., highlights, underline, bold, animations, effects, etc.) to attract the attention of the user. The augmented words 102 can be individual terms or phrases or other portions of text.

FIG. 2 is a screen shot of the web page 100 shown in FIG. 1, including a window 200 for displaying a coupon offer 202. In some implementations, the window 200 is displayed in response to user input, such as clicking a user interface element 106 associated with an augmented word 102 or rolling a cursor over the augmented word 102.

Although the window 200 is shown displaying a coupon offer 202, it should be apparent that the window 200 can present or display any kind of information (including graphical objects) that is contextually relevant to the augmented word 102. The window 200 can be formatted as desired, including its shape, color, style, fonts, etc. The window 200 can display text, graphical objects or a combination of both. In this particular implementation, if the user clicks on the coupon offer 202, a coupon (e.g., 40 cents off any bread product) will be downloaded to the user's computer or directly to the user's printer. The printed coupon can be redeemed at a participating retailer for associated products or services.

Figure 5A:
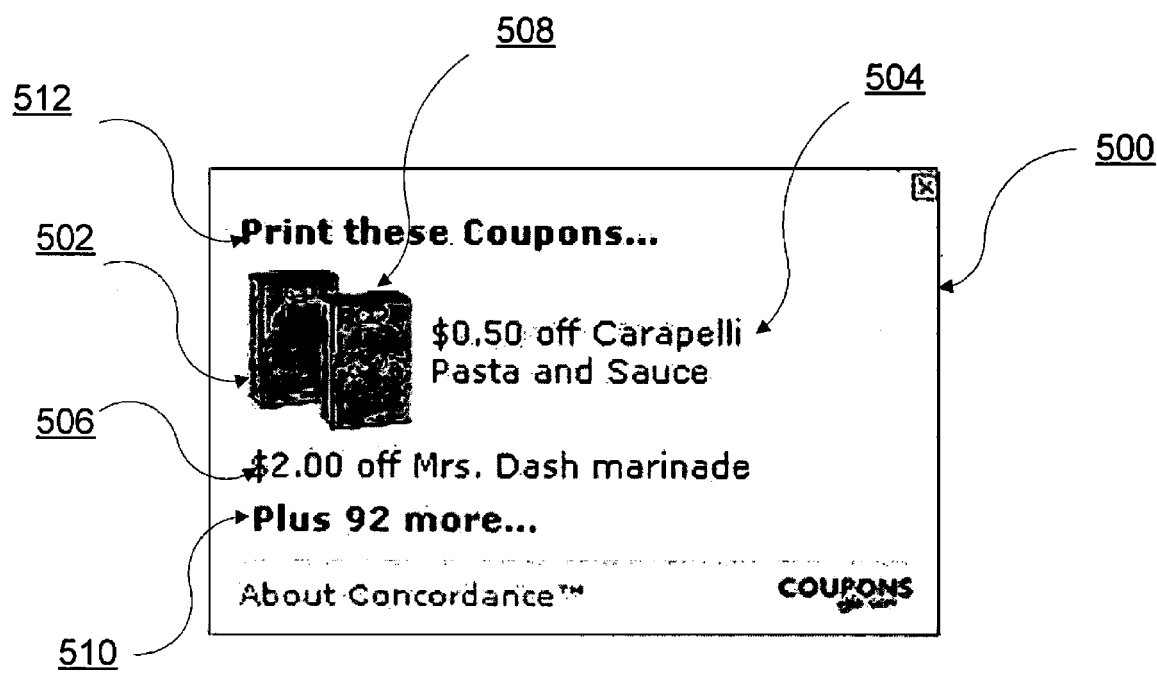
FIG. 5A is a screen shot of an exemplary display window for providing contextually relevant information of a coupon.

In some implementations, the format of each coupon can include an identification of an offer type and an offer value of an item of interest in the window 200. FIG. 5A is a screen shot of an exemplary display window 500 for providing contextually relevant information of a coupon 502.

Referring to FIG. 5A, a description of the item (e.g., product name, brand name, food category and the like) associated with the coupon 502 can be placed in a primary text field 504. The description can be brief to fit into the size of the window 500. The offer value of the coupon 502 (e.g., $0.50 off) can be arranged together with the description of the item in the primary text field 502. Alternatively, the offer value can be positioned anywhere on the coupon 502 separate from the primary text field 504. This allows the primary text field 504 to be utilized for additional information regarding the particular offer. For example, the additional information can include an offer type that identifies the item as qualifying for a buy-one-get-one-free or two-for-the-price-of-one offer. The offer value of the coupon 502 can be expressed as a reduced price for the item (e.g., $3.99 after savings), a reduction in the price of the item (e.g., save $1.00) or a reduction in the overall transaction when multiple items are purchased (e.g., save $2.00 when you buy two or more). As shown, a consumer can use the coupon 502 to deduct $0.50 from the purchase of a "Carapelli Pasta and Sauce" item. The reduction can be expressed in other mathematical fashions, such as a percentage discount (e.g., 10% off).

The window 500 also includes a secondary text field 506 that can be utilized to provide a textual link to a similar or affiliated item. For example, if the primary text field 504 describes an item of a particular brand, the secondary text field 506 can be used to provide a textual link to one or more coupon offers associated with a similar or identical item of another brand. As another example, if the primary text field 504 describes a breakfast item (e.g., bagels), the secondary text field 504 can be used to provide a textual link to one or more coupon offers for an affiliated item (e.g., cream cheese).

If desired, the coupon 502 can additionally include an expiration statement separate from the primary text field 502 and the secondary text field 504 for indicating the duration of the promotional offer, or a computer-generated bar code that electronically identifies the item and value of the coupon 502. An image field 508 for visually and graphically identifying the item associated with the coupon 502 also can be displayed in the window 500. The image field 508 can be placed in the vicinity of the primary text field 502 or the secondary text field 504, and accommodate an image of the item associated with the coupon 502. The image can include a In some implementations, if the user clicks on the print-coupon link 512, the coupon 502 can be downloaded to the user's computer or directly to the user's printer. Use of a printer connected to the user's computer provides the ability to produce a hardcopy of the coupon 502 that can be redeemed at a participating retailer for associated products or services.

FIG. 3 is a flow diagram of a content augmentation process 300. Some of the steps of process 300 can be performed in parallel in multi-threading environments. In some implementations, the steps of process 300 are instructions in a computer-readable medium (e.g., hard drive, memory, buses, waveforms), which, when executed by a processor causes the processor to perform the steps of process 300.

In some implementations, the process 300 begins by selecting content in one or more electronic documents to augment with one or more links to contextually relevant information (step 302). The content can be words, phrases, graphical objects and the like. The term "link" means to electronically associate content with information, such that user interaction with the augmented content results in access to or display of contextually relevant information. A link can also result in an operation performed on the content (e.g., printing or electronic-forwarding to an interested party).

The selected content is associated with contextually relevant information (step 304). The contextually relevant information can be any type of information that is relevant to the content. In some implementations, the contextually relevant information is stored in a database coupled to a network (e.g., the Internet) and is accessed through a network server. In some implementations, the content is a list of unique words selected from a web page. The list is sent to a network server where the words are matched with keywords that have been associated with information. For example, a list of unique words (e.g., sandwich, butter, milk, etc.) can be sent to a coupon server which associates the unique words with keywords (e.g., sandwich, butter, milk). In another implementation, the image of the item in the image field 508 is identified, and if the image contains a text portion, the text portion is searched for unique words. The unique words are then compared with the keywords in the network server. The keywords, each being associated with contextually relevant information (e.g., coupon offers), are used to perform a search query on a database of coupons. The query results include a list of coupons that are relevant to the keywords and may take into account other relevance criteria (e.g., price, availability or inventory). Any coupons that are not available to the web page publisher will be excluded from the process 300.

If desired, each keyword can be configured to associate with a corresponding image such that the process 300 can proceed with comparing the image in the image field 508 with the corresponding images of the keywords to identify contextually relevant information or relevant coupons.

Figure 5B:
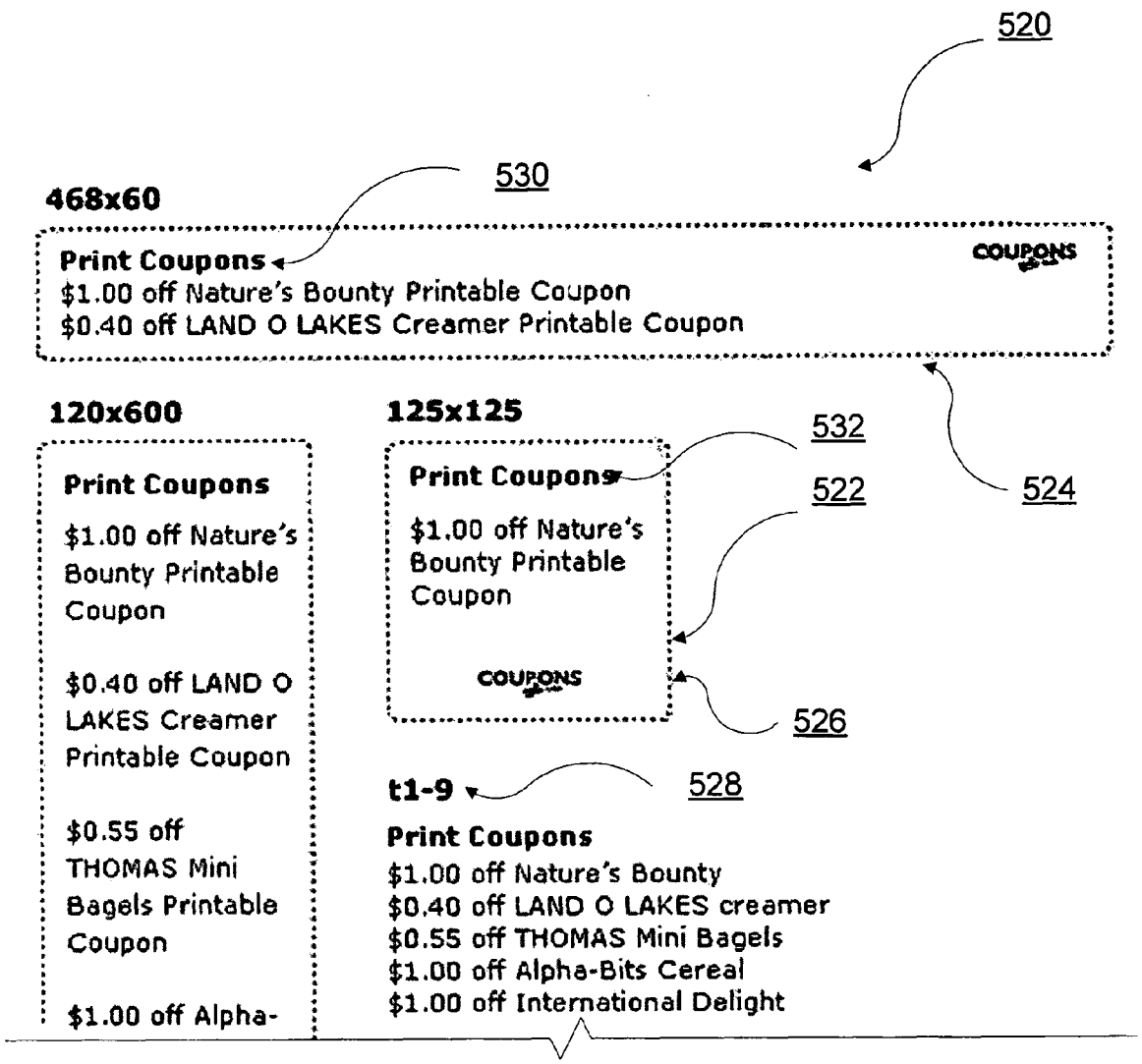
FIG. 5B is a screen shot of an exemplary display window in which additional coupons are displayed.

In some implementations, the coupons are prioritized based on one or more ranking criteria, such as the number of times a coupon is printed or redeemed. Contextual relevance may also be scored using counts of words on a page. The ranked coupons can then be arranged in a form of a priority list with, for example, the first coupon in the priority list being a coupon determined to be the most relevant or affiliated to the selected content. Temporarily referring back to FIG. 5A, the window 500 can be configured to display a coupon with the highest rank. Due to dimension limitation of the window 500, in some implementations, additional coupons are not displayed in the window 500 but can be accessed by clicking (e.g., mouse click or cursor movement) on the text contained in a third text field 510. For example, a user can click on "Plus 92 more" to access additional coupons associated with the coupon being displayed. The user also can access other coupons (e.g., randomly or in order of relevance) or coupons that are in a particular category using the third text field 510. The third text field 510 can provide a textual link to a separate display window in which additional coupons can be retrieved. FIG. 5B illustrates a screen shot of an exemplary display window 520 in which additional coupons are displayed.

Referring to FIG. 5B, the window 520 displays one or more additional coupons 522. In some implementations, coupons 522 are organized by their respective dimensions (e.g., resolution). For example, coupons that have a dimension size of 468×60 are organized into the same cluster (e.g., ad box 524) and coupons that have a dimension size of 125×125 are organized into a different cluster (e.g., ad box 526). In another implementations, coupons 522 are displayed only in text (i.e., without ad boxes 524 and 526). In these implementations, the window 520 can be configured to display a total number of coupons being displayed in text. For example, text 528 indicates that a total of nine coupons (coupon 1 to coupon 9) are displayed in text links. Coupons can be printed by clicking on an associated "Print Coupons" link. For example, the "Print Coupons" link 530 allows a user to print a hardcopy of the "$1.00 off Nature's Bounty Printable Coupon" and "$0.40 off Land O Lakes Creamer Printable Coupon" in the ad box 524, and the "Print Coupons" link 532 allows a user to print a hardcopy of the "$1.00 off Nature's Bounty Printable Coupon" in the ad box 526.

Referring back to FIG. 3, the process 300 generates instructions (e.g., JavaScript) for augmenting the selected content (step 306) with links. The selected content and the link can be highlighted, italicized or implemented with color to differentiate the augmented content from the normal text.

In some implementations, the instructions are dynamically included in the web page on-the-fly using known HTML (or DHTML) methods, properties and objects (e.g., document object model (DOM)) (step 308). The browser interprets the instructions which causes the selected content (e.g., sandwich, butter, milk) to be augmented with links to the contextually relevant information (step 310). Using the example of FIG. 2, if a user rolls their cursor across the word "sandwich," then a window 200 is presented which includes a coupon offer 202 for bread.

Figure 4:
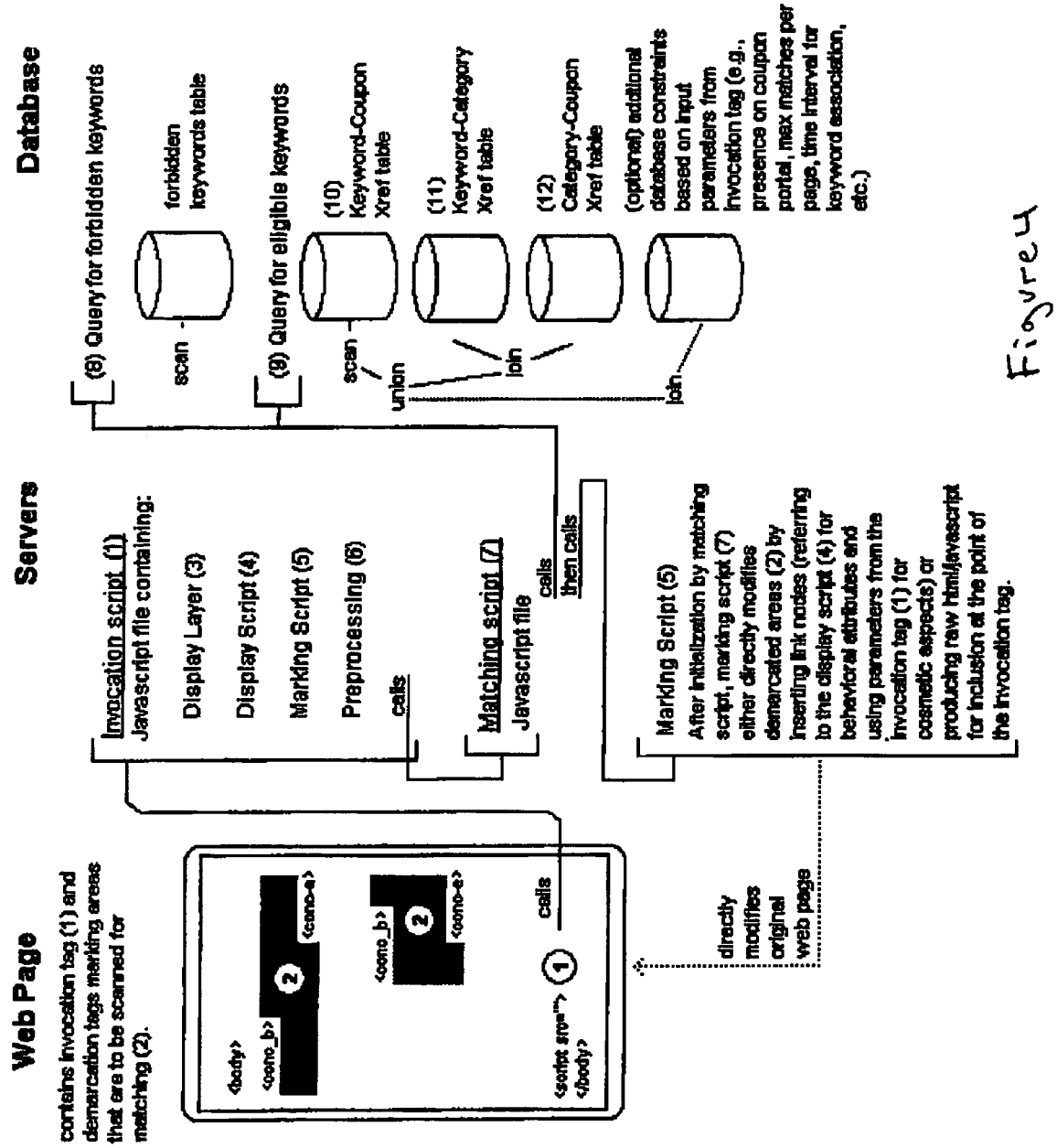
FIG. 4 is a block diagram of an exemplary system for augmenting web pages with links to contextually relevant information.
Figure 6:
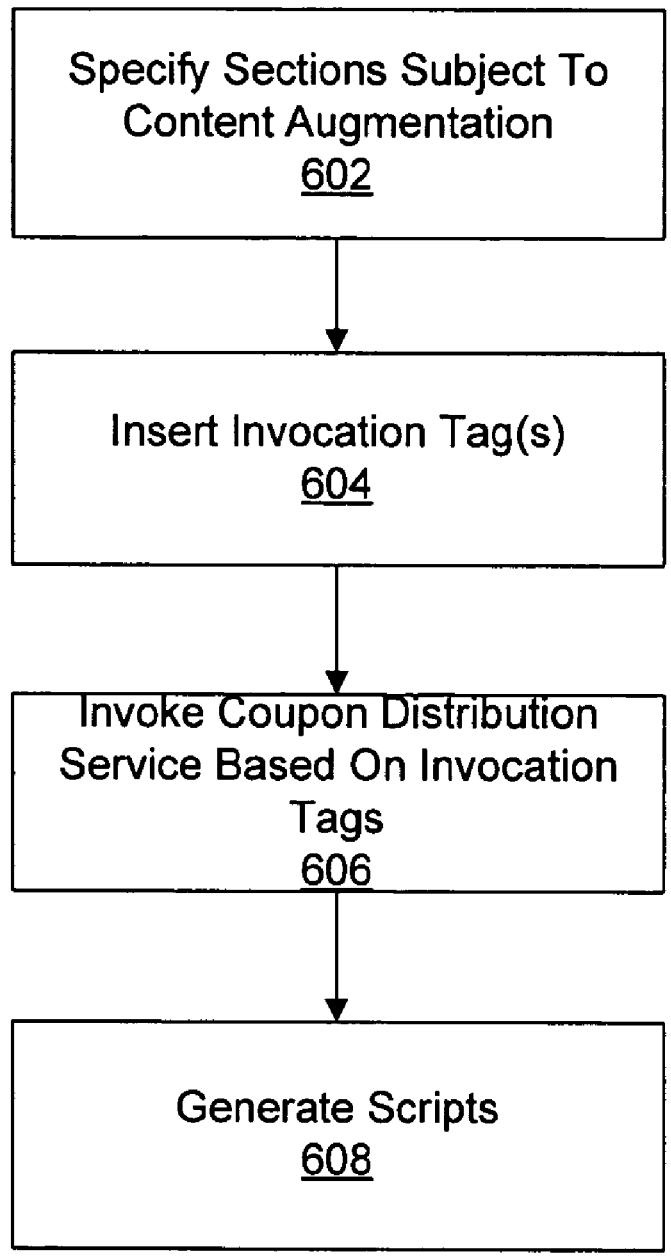
FIG. 6 shows an exemplary process for generating instructions for augmenting content selected for augmentation.

FIG. 4 will be described in conjunction with FIG. 6. FIG. 4 is a block diagram of an exemplary system for performing the content augmentation process 300, as described with respect to FIG. 3, and FIG. 6 shows an exemplary process 600 for generating instructions for augmenting content selected for augmentation. The exemplary system is an electronic coupon distribution system. It should be apparent, however, that the process 300 can be used in combination with a variety of applications other than electronic coupon distribution systems.

In some implementations, a web page author enables a web page to invoke an external device (e.g. a server for a coupon distribution service) in real-time by including an invocation tag (1) near the end of (and within) the <body> section of the web page's HTML code. By invoking the external source after all other <body> instructions have been interpreted, the author can ensure that the process 300 will not interfere with other <body> instructions. In some implementations, the invocation tag (1) further includes customization parameters affecting the display and context of any links (e.g., color, font, style, etc.) used to augment content.

The author can specify which sections of the web page will be subject to the process 300 by using demarcation tags (2) within the <body> of the web page (step 602). When the web page is rendered, the invocation tag (1) is inserted (step 604) and the external source is invoked (step 606). The invocation tag (1) writes into the containing document a display layer (3) for use by links provided by the distribution service, a display script (4) for displaying link information, and a marking script (5) for augmenting words in the web page with links at a later time (step 608). The display script (4) rendered by the invocation tag (1) parses the containing web page, preprocesses (6) the visible text nodes in the <body> section into a list of unique words, and uses a subset of this list in a call to a matching script (7) located at the external source.

Figure 7:
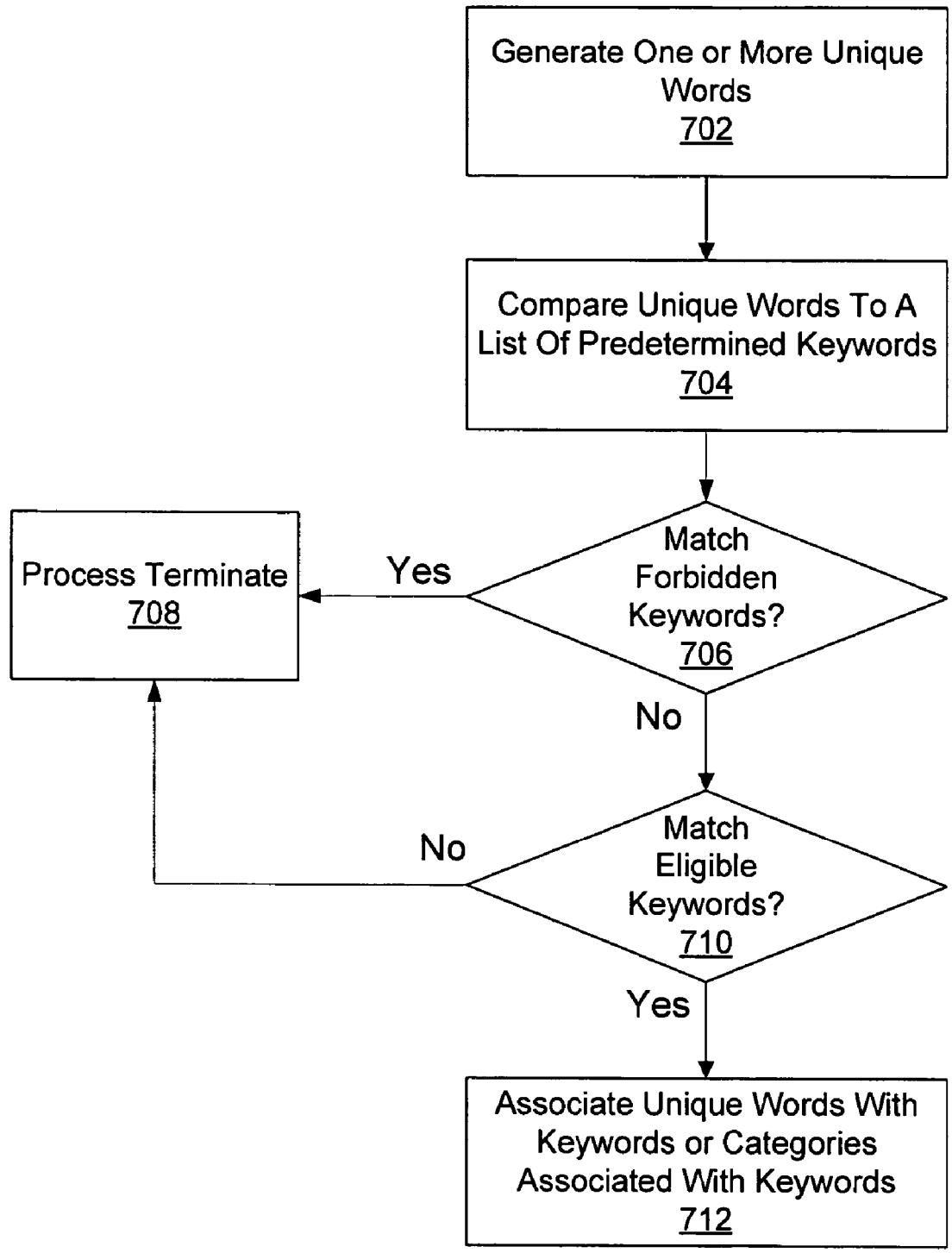
FIG. 7 shows an exemplary process for associating unique words in an electronic document with predetermined keywords in an electronic coupon distribution system.

FIG. 7 shows an exemplary process 700 for associating unique words in an electronic document with predetermined keywords in an electronic coupon distribution system. As shown, after a list of unique words is generated (step 702), the matching script (7) compares the submitted list to at least two lists of keywords at the external source (step 704). If any words in the submitted list match words in a list of forbidden words (8) ("Yes" branch of step 706), the process 300 is halted and the calling web page will not receive content augmentation (step 708). If the words in the submitted list do not match words in the list of forbidden words ("No" branch of step 706), process 700 proceeds to verify if the words in the submitted list match words in a predetermined list of eligible keywords ("No" branch of step 706). If any words in the submitted list match words in the list of eligible keywords (9) ("Yes" branch of step 710), the matching script (7) generates instructions (e.g., JavaScript) for initializing the marking script (5) and executes the marking script (5) (step 712). Else, process 700 is terminated ("No" branch of step 710).

The contents of the matching script (7) include links to various coupons and/or other offerings from the distribution service. In some implementations, the offerings are selected by matching an eligible keyword to a coupon offering directly via a keyword-coupon cross-reference table (10). In other implementations, the offerings are selected by matching an eligible keyword to a coupon offering indirectly through an association of the eligible keyword to a category via a keyword-category cross-reference table (11), then associating the category with a coupon offering via a category-coupon cross-reference table (12).

Figure 8:
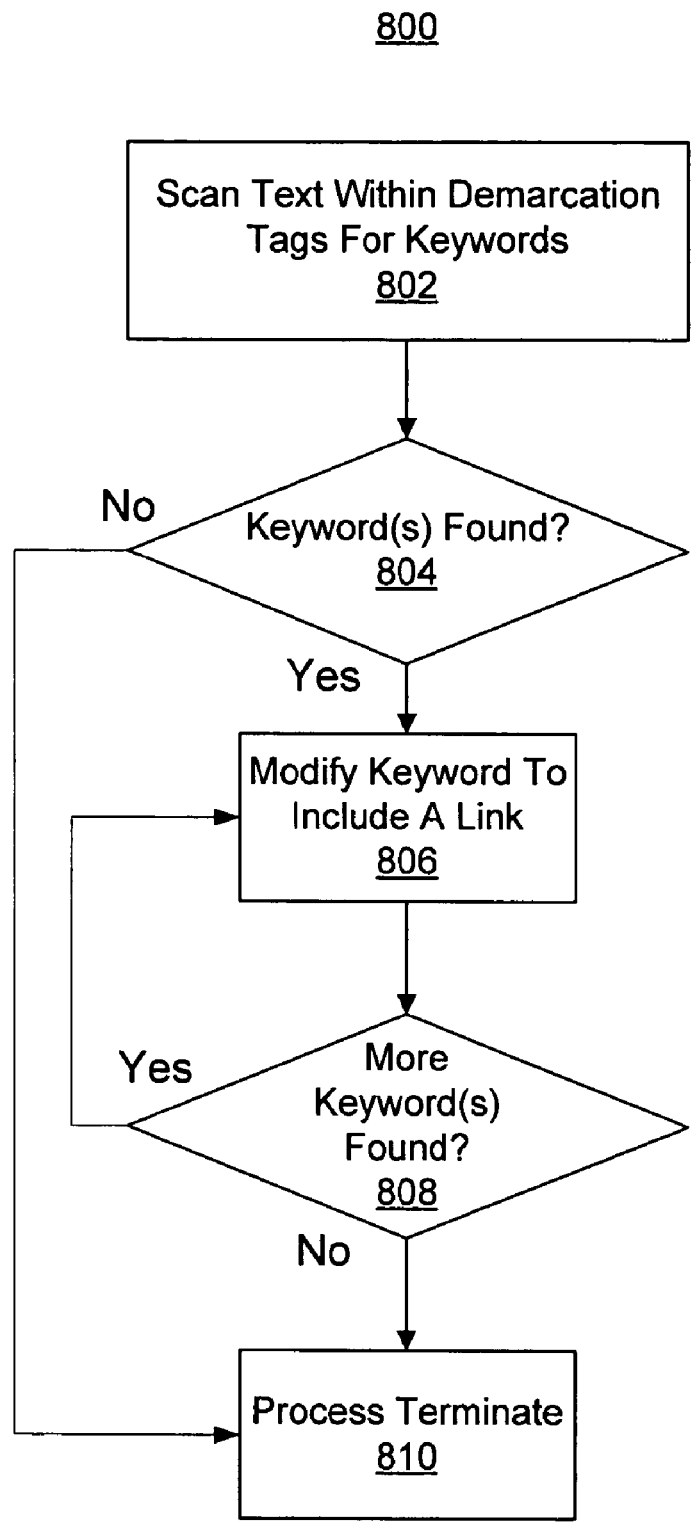
FIG. 8 shows an exemplary process for locating keywords in an electronic document.

FIG. 8 shows an exemplary process 800 for locating keywords in an electronic document. The marking script (5), when executed, scans the visible text within the demarcation tags (2) for keywords (step 802). For each keyword found ("Yes" branch of step 804), the containing document is augmented by replacing the first text node found containing the keyword with new nodes: a text node including any text in the original text node that occurs before the keyword, and a link node (or "A"-tag) containing the keyword as its text and a linking via its HREF property to the display script (4) (step 806). The marking script (5) scans the visible text within the demarcation tags (2) until all matched keywords in all text nodes have been processed ("Yes" branch of step 808), or until a preset limit on the number of matches has been reached. At this point, the matching script (7) and the invocation tag (1) are fully rendered and the augmentation process 300 is complete (step 810). The augmentation process 300 is terminated when no keyword is found ("No" branch of step 804 or step 808).

The invention and all of the functional operations described herein can be implemented in digital electronic circuitry, or in computer hardware, firmware, software, or in combinations of them. The invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
   providing a first set of instructions configured to cause a client device to:
   parse a displayed portion of content, locate a set of terms in the displayed portion of content, based on the parsing; and,
   in response to locating the set of terms, send the set of terms to a server;
   receiving, at the server, from the client device, a first request comprising the set of terms;
   based on the set of terms, the server identifying one or more coupon offers;
   in response to the first request, the server sending to the client device a second set of instructions configured to cause the client device to:
   display, in association with a particular term in the displayed portion of content, an interface comprising information about the one or more coupon offers and a control for selecting a particular coupon offer of the one or more coupon offers; and,
   upon a user selecting the control, send information identifying the particular coupon offer to a coupon distribution server;
   wherein the second set of instructions is further configured to cause display of a plurality of interfaces, each interface of the plurality of interfaces configured to appear in association with a different term of the set of terms, and each interface of the plurality of interfaces comprising information about at least one coupon offer, of the one or more coupon offers, that was identified by the server based on the different term in association with which the interface is configured to appear;
   receiving, at the coupon distribution server, from the client device, a second request identifying the particular coupon offer;
   in response to the second request, the coupon distribution server providing the user with a coupon corresponding to the particular coupon offer;
   wherein at least the steps of identifying one or more coupon offers and providing the coupon are performed by one or more computing devices.

2. The method of claim 1, wherein providing the first set of instructions comprises sending the first set of instructions to the client device.

3. The method of claim 1, wherein the client device comprises a browser that executes the first set of instructions and the second set of instructions.

4. The method of claim 1, wherein the displayed portion of content is a portion of a web page delimited by a predefined tag.

5. The method of claim 1, wherein providing the coupon comprises providing a printable copy of the coupon.

6. The method of claim 1, further comprising:
   in response to the first request, the coupon distribution server identifying a plurality of coupon offers based on the set of terms;
   the coupon distribution server returning a presentation of information about the plurality of coupon offers, the presentation being prioritized based on the number of times coupons have previously printed or redeemed coupons for each coupon offer in the plurality of coupon offers.

7. The method of claim 1, wherein the second set of instructions is further configured to cause displaying the interface in association with a particular term of the set of terms for which the particular coupon offer was selected.

8. The method of claim 7, wherein the second set of instructions is further configured to cause modifying the particular term to include a link configured to cause display of the interface as a pop-up interface upon selection of the link.

9. The method of claim 1, wherein identifying the one or more coupon offers comprises querying a database of coupon offers from a plurality of manufacturers based on one or more keywords, wherein the one or more keywords are either the set of terms, or identified based on the set of terms.

10. The method of claim 1, wherein the second set of instructions is configured to cause each interface of the plurality of interfaces to appear in association with a different term of the set of terms upon selection of the different term at the client device.

11. One or more non-transitory computer-readable storage media storing instructions that, when executed by one or more computing devices, cause performance of:
    providing a first set of instructions configured to cause a client device to:
    parse a displayed portion of content, locate a set of terms in the displayed portion of content, based on the parsing; and,
    in response to locating the set of terms, send the set of terms to a server;
    receiving, at the server, from the client device, a first request comprising the set of terms;
    based on the set of terms, the server identifying one or more coupon offers;
    in response to the first request, the server sending to the client device a second set of instructions configured to cause the client device to:
    display, in association with a particular term in the displayed portion of content, an interface comprising information about the one or more coupon offers and a control for selecting a particular coupon offer of the one or more coupon offers; and,
    upon a user selecting the control, send information identifying the particular coupon offer to a coupon distribution server;

wherein the second set of instructions is further configured to cause display of a plurality of interfaces, each interface of the plurality of interfaces configured to appear in association with a different term of the set of terms, and each interface of the plurality of interfaces comprising information about at least one coupon offer, of the one or more coupon offers, that was identified by the server based on the different term in association with which the interface is configured to appear;

receiving, at the coupon distribution server, from the client device, a second request identifying the particular coupon offer;

in response to the second request, the coupon distribution server providing the user with a coupon corresponding to the particular coupon offer.

12. The one or more non-transitory computer-readable storage media of claim 11, wherein providing the first set of instructions comprises sending the first set of instructions to the client device.

13. The one or more non-transitory computer-readable storage media of claim 11, wherein the client device comprises a browser that executes the first set of instructions and the second set of instructions.

14. The one or more non-transitory computer-readable storage media of claim 11, wherein the displayed portion of content is a portion of a web page delimited by a predefined tag.

15. The one or more non-transitory computer-readable storage media of claim 11, wherein providing the coupon comprises providing a printable copy of the coupon.

16. The one or more non-transitory computer-readable storage media of claim 11, wherein the instructions, when executed by the one or more computing devices, further cause performance of:

in response to the first request, the coupon distribution server identifying a plurality of coupon offers based on the set of terms;

the coupon distribution server returning a presentation of information about the plurality of coupon offers, the presentation being prioritized based on the number of times coupons have previously printed or redeemed coupons for each coupon offer in the plurality of coupon offers.

17. The one or more non-transitory computer-readable storage media of claim 11, wherein the second set of instructions is further configured to cause displaying the interface in association with a particular term of the set of terms for which the particular coupon offer was selected.

18. The one or more non-transitory computer-readable storage media of claim 17, wherein the second set of instructions is further configured to cause modifying the particular term to include a link configured to cause display of the interface as a pop-up interface upon selection of the link.

19. The one or more non-transitory computer-readable storage media of claim 11, wherein identifying the one or more coupon offers comprises querying a database of coupon offers from a plurality of manufacturers based on one or more keywords, wherein the one or more keywords are either the set of terms, or identified based on the set of terms.

20. The one or more non-transitory computer-readable storage media of claim 11, wherein the second set of instructions is configured to cause each interface of the plurality of interfaces to appear in association with a different term of the set of terms upon selection of the different term at the client device.

* * * * *